(12) United States Patent
Sundling et al.

(10) Patent No.: US 7,487,565 B1
(45) Date of Patent: Feb. 10, 2009

(54) HUNTING MULTI-TOOL

(76) Inventors: Robert S. Sundling, 507 County Rd. 2100, Crete, NE (US) 68333-4247; Merlin Betts, 1809 Linden Ave., Crete, NE (US) 68333

( * ) Notice: Subject to any disclaimer, the term of this patent is extended or adjusted under 35 U.S.C. 154(b) by 0 days.

(21) Appl. No.: 11/803,630

(22) Filed: May 15, 2007

(51) Int. Cl.
  *B26B 11/00* (2006.01)
  *B26B 29/00* (2006.01)
  *A45F 5/00* (2006.01)
  *A22B 5/10* (2006.01)

(52) U.S. Cl. .............................. 7/158; 30/287; 294/153; 452/103

(58) Field of Classification Search ............. 7/158, 7/161, 167, 168, 148, 118, 163, 164; 30/155, 30/287; 294/26, 153; 224/921; 452/103; 16/422, 110.1
See application file for complete search history.

(56) References Cited

U.S. PATENT DOCUMENTS

| 2,651,106 | A |   | 9/1953 | Breitzke | |
|---|---|---|---|---|---|
| 3,241,236 | A |   | 3/1966 | Capps | |
| 3,791,033 | A | * | 2/1974 | Regan | 30/155 |
| 4,363,147 | A | * | 12/1982 | Deweese | 7/158 |
| 4,528,751 | A |   | 7/1985 | Bremer et al. | |
| 4,669,186 | A |   | 6/1987 | Liu | |
| 4,688,287 | A |   | 8/1987 | Siino | |
| D333,695 | S | * | 3/1993 | Gatto et al. | D22/199 |
| 5,581,895 | A |   | 12/1996 | Jeffcoat | |
| 6,006,403 | A | * | 12/1999 | Battiato | 16/422 |
| 6,142,769 | A | * | 11/2000 | Walker | 7/158 |
| 6,318,218 | B1 |   | 11/2001 | Anderson et al. | |
| 6,336,731 | B1 |   | 1/2002 | Chien | |
| 6,578,271 | B1 |   | 6/2003 | Macek | |
| D492,078 | S | * | 6/2004 | Syzdek | D34/28 |
| 7,126,484 | B1 | * | 10/2006 | Luquire | 7/158 |

\* cited by examiner

*Primary Examiner*—Hadi Shakeri
(74) *Attorney, Agent, or Firm*—Dennis L. Thomte; Thomte Patent Law Office

(57) ABSTRACT

A hunting multi-tool is provided with a base frame having a handle and a drag bar. A first blade is coupled with the base frame and may be moved between skinning and gutting positions. A drag line depends from the drag bar and may be secured to a cleat coupled with the base frame. Second and third blades may be pivotably extended from the handle portion and covered with a handle cover when not in use. Other useful hunting accessories may be combined in a logical fashion with the base frame and aforementioned accessories.

19 Claims, 4 Drawing Sheets

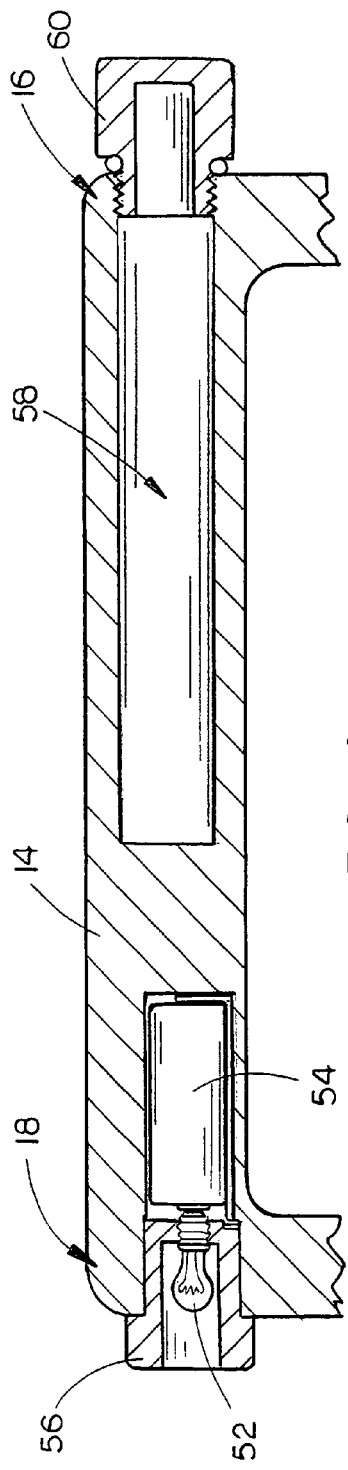
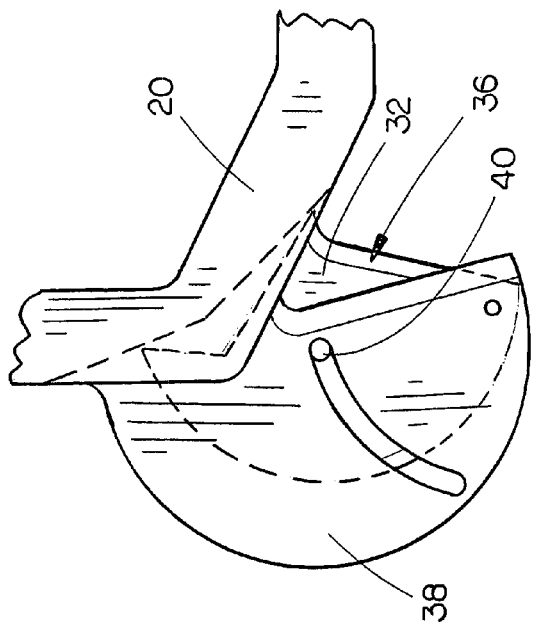
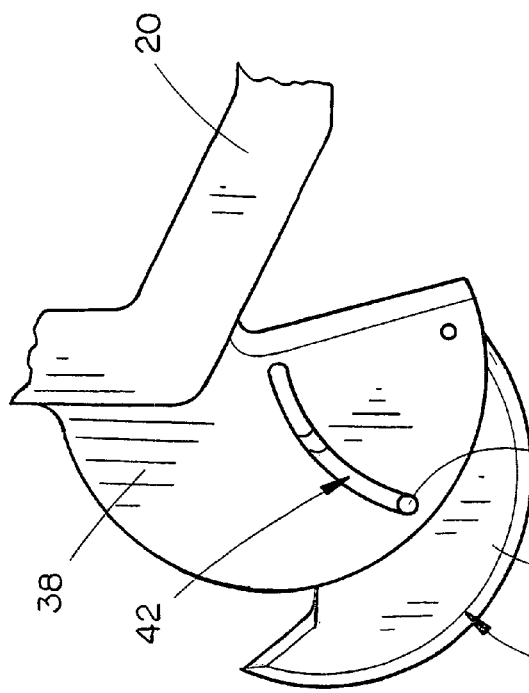
FIG. 4
FIG. 6
FIG. 5

HUNTING MULTI-TOOL

BACKGROUND

Hunters frequently require a significant amount of equipment while hunting in remote areas. Various articles, such as a compass, skinning knife, gut hook, game dragging device, matches, a timepiece, a saw, a flashlight, and other such articles are frequently piled into a backpack. Storing a plurality of items within the bowels of a backpack can create unnecessary weight and bulk, and result in an inability to find one or more particular items when they are needed.

Combining several of the essential hunting accessories with one another would reduce the volume of separate items carried by a hunter. Such device combinations could also increase the relative ease in which various devices could be found as they are needed. Unfortunately, the prior art has failed to provide a hunting multi-tool that effectively combines a substantial portion of the hunting accessories used by most hunters. Part of the difficulty in designing such a multi-tool is the fact that many such hunting accessories require handles of various shapes and sizes. Creating a device that uses a single handle to use a plurality of different accessories can be a daunting task. Moreover, the accessory combinations within a multi-tool must logically fit with one another and combine in a manner that renders the multi-tool safe and easy to use.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hunting multi-tool of the present invention is generally provided with a base frame, having an elongated handle with opposite first and second end portions. A drag bar, with opposite first and second end portions, is operatively coupled with the opposite ends of the handle. The handle and drag bar define an open center portion. An elongated drag line, having opposite first and second end portions is coupled at its first end portion with the drag bar. The second end portion of the drag line is adapted to be operatively coupled with a portion of game, such that a user may transport the game from one location to another. A first blade, having at least one cutting edge, is operatively coupled with the base frame in a manner that permits the base frame to be used by a user as a handle to manipulate the first blade throughout a cutting operation.

In a preferred embodiment the first blade is provided with first and second cutting edges. The blade is movable between a closed and various cutting positions. The various cutting positions may provide various uses, such as skinning and gutting. A sheath may be coupled with the base frame and used to shield the various cutting edges of the first blade when not in use.

In various aspects of the invention, a multitude of accessories may be logically coupled with the base frame to provide a complete hunting tool. A cleat may be used to properly stow the drag line. A light-emitting device, compass and storage compartment may also be associated with the base frame. Second and third blades may be provided to pivot outwardly from opposite side portions of the handle. An optional handle cover may also be provided to guard a user's hand from the second and third blade as well as provide comfort when the multi-tool is being used to transport game.

It is therefore a principal object of the present invention to provide a hunting multi-tool that combines a plurality of hunting accessories into a single tool.

A further object of the present invention is to provide a hunting multi-tool that provides a game-dragging tool with a skinning and gutting knife.

Still another object of the present invention is to provide a game-dragging tool having a cleat to stow a drag line when it is not in use.

Yet another object of the present invention is to provide a hunting multi-tool having a plurality of blades associated with a base frame to provide a multitude of cutting features.

A further object of the present invention is to provide a hunting multi-tool that combines a drag bar with a single blade member that may be pivoted between skinning and gutting positions.

Still another object of the present invention is to provide a hunting multi-tool that incorporates a light-emitting device, storage compartment, compass, timepiece and a game transporting device.

Yet another object of the present invention is to provide a hunting multi-tool that is relatively simple to manufacture and use.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 depicts a partial, side elevation view of one preferred embodiment of a handle portion of the hunting multi-tool of the present invention;

FIG. 5 depicts a partial, isometric view of one preferred embodiment of a blade attachment, in a skinning position, as the same may be used with the hunting multi-tool of the present invention; and FIG. 6 depicts a partial, isometric view of the blade attachment of FIG. 5, in a gut-hook position, as the same may be used with the hunting multi-tool of the present invention.

DETAILED DESCRIPTION

Figure 1:
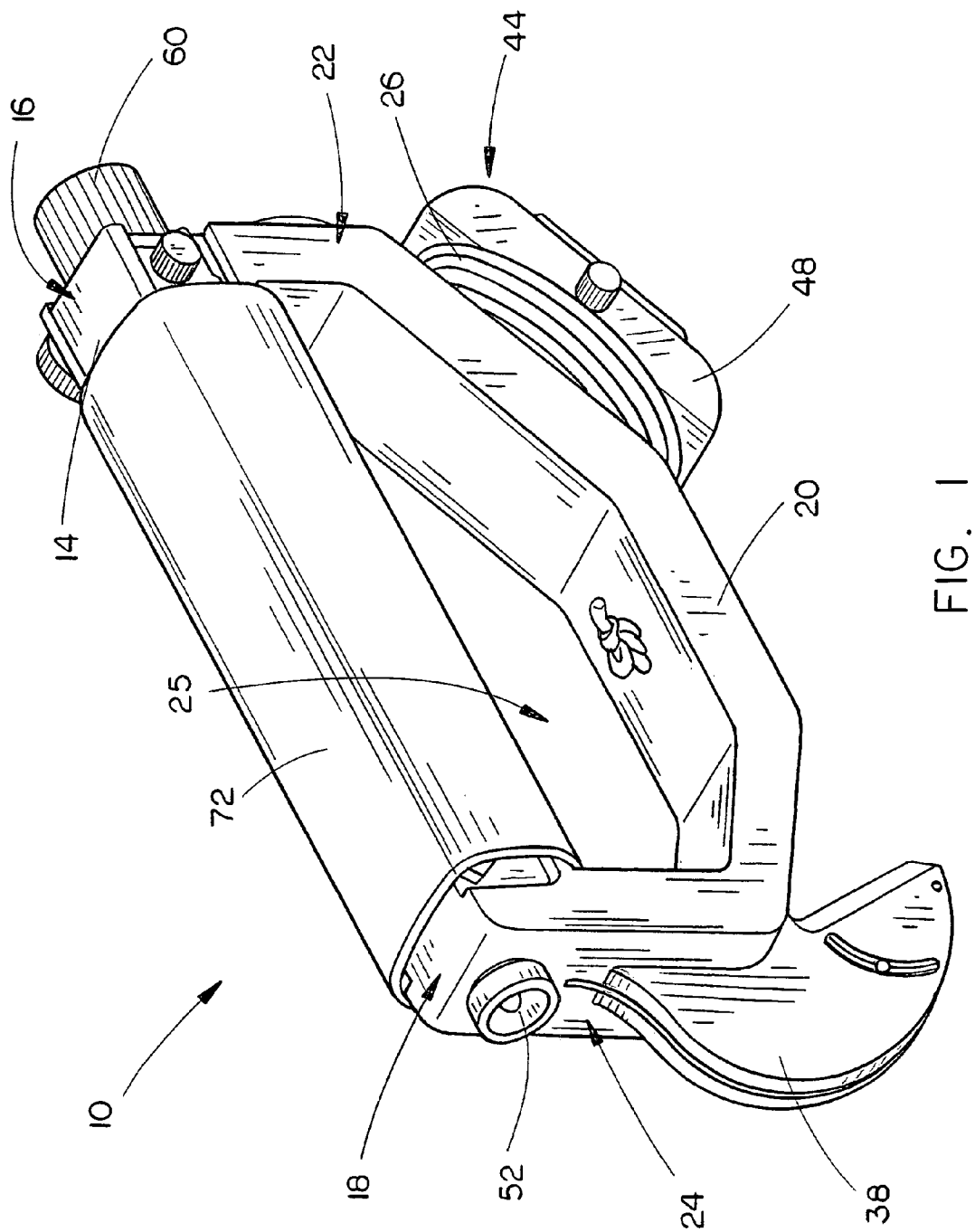
FIG. 1 depicts a perspective view of one preferred embodiment of the hunting multi-tool of the present invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hunting multi-tool 10 of the present invention is generally provided with a base frame 12 having an elongated handle 14 with opposite first and second end portions 16 and 18, respectively, and a drag bar 20 with a first end portion 22 and a second end portion 24. The first end portion 16 of the handle 14 is operatively coupled with the first end portion 22 of the drag bar 20. Likewise, the second end portion 18 of the handle 14 is coupled with the second end portion 24 of the drag bar 20. In a preferred embodiment, the handle 14 and drag bar 20 are coupled with one another to define an open center portion 25. While various shapes are contemplated, one preferred embodiment of the hunting multi-tool 10 provides the base frame 12 in a generally D-shape. As will be discussed in greater detail herein below, the D-shape will promote the ergonomic use of various accessories coupled within the hunting multi-tool 10.

Figure 3:
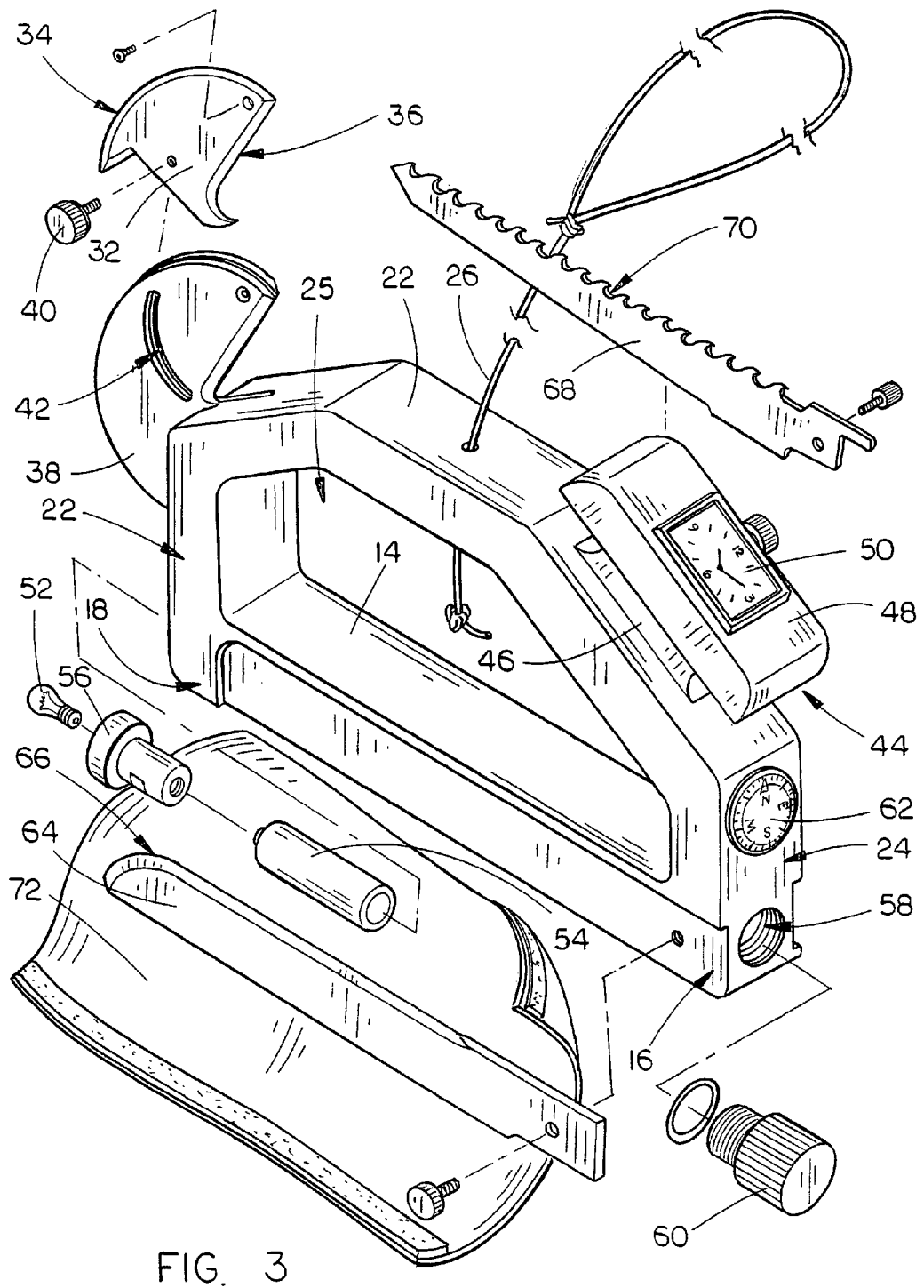
FIG. 3 depicts an exploded, perspective view of the multi-tool depicted in FIG. 1 and a multitude of various optional attachments that may be incorporated therewith.

An elongated drag line 26, having a first end portion 28 and second end portion 30, is operatively coupled at its first end portion 28 with the drag bar 20. The second end portion 30 of the drag line 26 should be adapted to be operatively coupled with a portion of game, such that a user may transport the game from one location to another. Such adaptation may be accomplished by forming a simple loop or noose, such as depicted in FIG. 3. Other structural devices, including hooks, carabiners, self-securing straps, and the like may also provide the adaptation desired for transporting various types of game. It is contemplated that the elongated drag line 26 may be formed from various elongated structures, including cord, rope, straps, and chain, all of various compositions. The specific intended use, desired durability, and cost of materials may dictate the material selected for the elongated drag line 26.

The hunting multi-tool 10 should be provided with a first blade 32, having at least a first cutting edge 34, operatively coupled with the base frame 12 in a manner that permits the base frame 12 to be used by a user as a handle to manipulate the first blade 32 throughout a cutting operation. In at least one preferred embodiment, the first blade 32 is also provided with a second cutting edge 36. An example of such a first blade 32, having a first cutting edge 34 and second cutting edge 36 is depicted in FIG. 3. It is contemplated that the cutting edges may be shaped and oriented to provide different functions. For example, the first cutting edge 34, with its broad, rounded geometry may provide an excellent skinning blade. The second cutting edge 36, with its hook-shaped geometry may provide an effective gut-hook blade. A sheath 38 may be provided to substantially enclose the first blade 32 in a closed position, such as depicted in FIG. 1. In one embodiment, the first blade 32 may be pivotably coupled with the sheath 38 so that it may be moved between one or more cutting positions and its closed position. A set screw 40 may be coupled with the sheath 38 and the first blade 32, such that the set screw 40 is moveable along a path defined by an open slot 42, formed in the sheath 38. Preferably, the set screw 40 will be rotatably moveable with respect to the sheath 38 and the first blade 32 in a manner that permits the set screw 40 to selectively lock the first blade 32 in a plurality of cutting and closed positions with respect to the sheath 38.

The position and general orientation of the sheath 38, as depicted in FIG. 1, optimizes use of the first blade 32 in skinning and gutting operations. FIG. 5 depicts the first blade 32 in a cutting position beneficial for skinning. The position of the sheath 38 closely adjacent the first end portions of the handle 14 and the drag bar 20, with the first cutting edge 34 on the handle side of the base frame 12, increases the relative ease with which the hunting multi-tool 10 can be used in a skinning operation. Similarly, FIG. 6 depicts the first blade 32 in a gutting position, wherein the second cutting edge 36 is faced toward the drag bar 20. In this position, the user may grasp the handle 14 in various positions that maximize the leverage created by the positioning of the first blade 32 and sheath 38 for a gutting operation.

Figure 2:
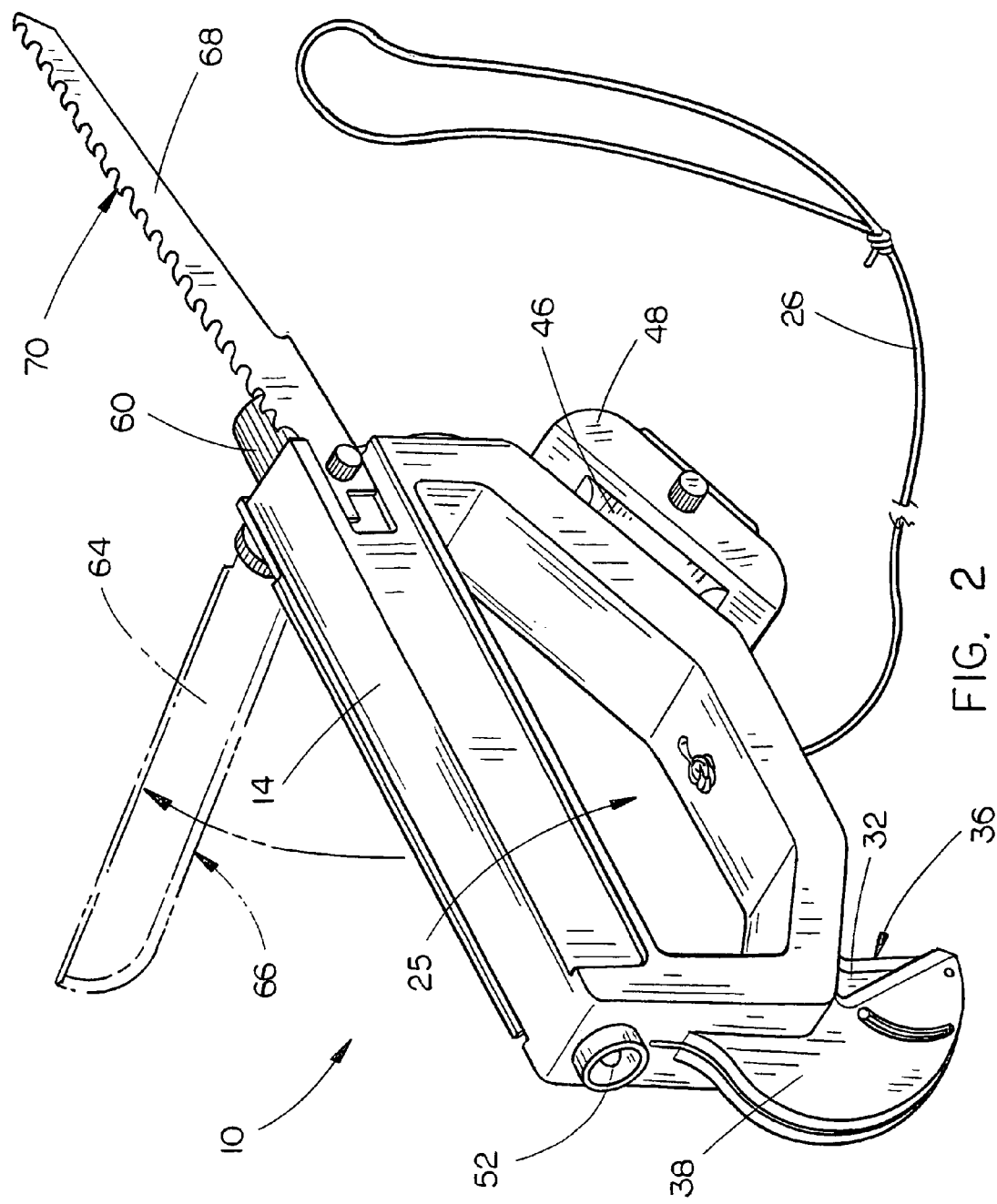
FIG. 2 depicts a perspective view of the hunting multi-tool depicted in FIG. 1 and demonstrates various methods of deploying a number of optional accessories therefrom.

In at least one preferred embodiment, a cleat 44 may be provided for use in securing the drag line 26 when it is not in use. An example of such a cleat 44 is depicted in FIGS. 1-3. The cleat 44 may be provided with a stem portion 46, having opposite ends that are coupled with the base frame 12 and a head portion 48. Preferably, the stem 46 and head portion 48 are shaped and sized to receive at least a substantial portion of the drag line 26 in a secured position, wound about the stem portion 46. The head portion 48 should be provided with a sufficient size and shape to substantially prohibit the drag line 26 from becoming unintentionally removed from the stem 46. An optional timepiece 50 may be associated with some structural portion of the base frame 12, including the head portion 48, as depicted in FIG. 3. The timepiece 50 is depicted as being a manually wound device, as it is contemplated that the hunting multi-tool 10 will be used seasonally and batteries may expire at inopportune moments. However, electric timepieces may easily be incorporated within the design of the hunting multi-tool 10.

A light-emitting device 52 may also be associated with the base frame 12. Various devices, including LEDs, incandescent lamps and other such lighting devices will likely suffice for providing useable light, while hunting. A battery 54, or other power source may be associated with the light-emitting device to power the same. Various modes of operation may be employed, including a simple selector switch. The light-emitting device 52 depicted in the figures is activated and deactivated by simple rotation of the light housing 56.

Depending upon the size and shape of the handle 14 or other portions of the hunting multi-tool 10, a storage compartment 58 may be formed to provide convenient storage for items such as matches, medication, fishing line, and the like. A cap 60 and optional water resistant seal may be provided for selectively closing the opening to the storage compartment 58. Another accessory that may be associated with the cap 60 or the base frame 12 is a compass 62, which may be provided in a useful but compact form.

In at least one preferred embodiment the hunting multi-tool 10 is provided with a second blade 64, having opposite end portions and at least one cutting edge 66. One end portion of the second blade 64 may be operatively coupled with the base frame 12 in a manner that permits the base frame 12 to be used by a user as a handle to manipulate the second blade 64 throughout a cutting operation. In one specific embodiment, the second blade 64 may be pivotably coupled with one side of the handle 14 so that the second blade 64 may be moved between an extended position, generally parallel with a long axis of the handle 14 with the opposite end portion of the second blade 64 being positioned away from the handle 14, and a retracted position, generally parallel with the long axis of the handle 14 with the opposite end portion of the second blade 64 being positioned closely adjacent the handle 14. Likewise, a third blade 68, having opposite end portions and a cutting edge 70 may be pivotably coupled with an opposite side of the handle 14 so that the third blade 68 may be moved between extended and retracted positions similar to that described for the second blade 64. The second blade 64 and third blade 68 may be provided in various forms, such as a single edged knife and a saw, respectively, according to the intended uses of the hunting multi-tool 10. A handle cover 72 may be removably coupled with the handle 14 and shaped and sized to substantially cover the second blade 64 and third blade 68 when the second blade 64 and third blade 68 are in their respective retracted positions. In this manner, the handle cover 72 will substantially prevent direct engagement between cutting portions on the second blade 64 and third blade 68 and a user's hand when the user grips the handle 14. While it is contemplated that the handle cover 72 could be formed from various different materials, it will be preferred that the handle cover 72 be formed from a generally weather resistant and durable material. More specifically, the handle cover 72 should be comprised of a deformably resilient material, including various natural and synthetic rubbers, open and closed cell foams, and the like. Such materials will provide comfort to a user's hands when using the hunting multi-tool 10 in its various potential uses.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A hunting multi-tool, comprising:
   a base frame, having an elongated handle with opposite first and second end portions and a drag bar with opposite first and second end portions; said first end portion of said handle being operatively coupled with the first end portion of said drag bar and said second end portion of said handle being operatively coupled with the second end portion of said drag bar to define an open center portion;
   an elongated drag line, having opposite first and second end portions; said first end portion of said drag line being operatively coupled with said drag bar; said second end portion of said drag line being adapted to be operatively coupled with a portion of game, such that a user may transport the game from one location to another;
   a first blade, having at least one cutting edge, operatively coupled with said base frame in a manner that permits said base frame to be used by a user as a handle to manipulate said first blade throughout a cutting operation;
   said first blade being pivotably movable with respect to said base frame, such that said first blade may be selectively moved between at least one cutting position, which exposes a first cutting edge in a manner that permits said first cutting edge to be selectively engaged with foreign objects and a closed position, which substantially shelters said first cutting edge from engagement with foreign objects;
   said first blade being provided with a second cutting edge that is positioned on said cutting blade in a manner that permits said cutting blade to be selectively moved into a second cutting position, which exposes said second cutting edge in a manner that permits said second cutting edge to be selectively engaged with foreign objects, while simultaneously, substantially sheltering said first cutting edge from engagement with foreign objects.

2. The hunting multi-tool of claim 1 wherein said closed position substantially shelters said first cutting edge and said second cutting edge from engagement with foreign objects.

3. The hunting multi-tool of claim 2 wherein said first cutting position substantially shelters said second cutting edge from engagement with foreign objects).

4. The hunting multi-tool of claim 3 wherein said first cutting position presents said first cutting edge as a skinning blade.

5. The hunting multi-tool of claim 4 wherein said second cutting position presents said second cutting edge as a gut-hook blade.

6. The hunting multi-tool of claim 2 further comprising a sheath that extends outwardly from said base frame to substantially enclose said first blade in said closed position.

7. The hunting multi-tool of claim 6 wherein said first blade is pivotably coupled with said sheath.

8. The hunting multi-tool of claim 7 further comprising a set screw that is operatively coupled with said sheath and said first blade; said set screw being movable along a path defined by an open slot formed in said sheath and rotatably movable with respect to said sheath and said first blade in a manner that permits said set screw to selectively lock said first blade in a plurality of different positions with respect to said sheath.

9. The hunting multi-tool of claim 1 further comprising a cleat extending outwardly from said base frame; said cleat being comprised of a stem portion, having a first end portion coupled with said base frame and a second end portion coupled with a head portion; said cleat being shaped and sized to receive at least a substantial portion of said drag line in a secured position, wound about said stem portion.

10. The hunting multi-tool of claim 9 further comprising a timepiece, associated with the head portion of said cleat, capable of relaying time information to a user.

11. The hunting multi-tool of claim 1 further comprising a light-emitting device, coupled with said base frame and associated with a power source so that said light-emitting device may be selectively actuated to emit light away from said base frame.

12. The hunting multi-tool of claim 1 further comprising a storage compartment, formed within said base frame; said storage compartment having an opening that may be selectively closed by a cap.

13. The hunting multi-tool of 1 further comprising a compass coupled with said base frame.

14. The hunting multi-tool of claim 1 further comprising a second blade, having opposite first and second end portions and at least one cutting edge; said first end portion of said second blade being operatively coupled with said base frame in a manner that permits said base frame to be used by a user as a handle to manipulate said second blade throughout a cutting operation.

15. The hunting multi-tool of claim 14 wherein said second blade is pivotably coupled with one side of said handle so that the second blade may be moved between an extended position, generally parallel with a long axis of said handle with the second end portion of said second blade being positioned away from said handle, and a retracted position, generally parallel with the long axis of said handle with the second end portion of said second blade being positioned closely adjacent said handle.

16. The hunting multi-tool of claim 14 further comprising a third blade, having first and second end portions, pivotably coupled with a second side of said handle so that the third blade may be moved between an extended position, generally parallel with a long axis of said handle with the second end portion of said third blade being positioned away from said handle, and a retracted position, generally parallel with the long axis of said handle with the second end portion of said third blade being positioned closely adjacent said handle.

17. The hunting multi-tool of claim 16 wherein said third blade is a saw blade.

18. The hunting multi-tool of claim 16 further comprising a handle cover that is removably coupled with said handle and shaped and sized to substantially cover said second blade and said third blade when said second blade and third blade are in said retracted positions to substantially prevent direct engagement between cutting portions on said second blade and said third blade and a user's hand when the user grips said handle.

19. The hunting multi-tool of claim 18 wherein said handle cover is comprised of a deformably resilient material.

* * * * *